United States Patent [19]

Bechtle

[11] 3,818,109

[45] June 18, 1974

[54] CONVERSION OF WHEY SOLIDS TO AN EDIBLE YEAST CELL MASS

[75] Inventor: Robert M. Bechtle, Manhattan, Kans.

[73] Assignee: Kansas State University Research Foundation, Manhattan, Kans.

[22] Filed: Apr. 11, 1973

[21] Appl. No.: 350,126

Related U.S. Application Data

[63] Continuation-in-part of Ser. No. 126,308, March 19, 1971, abandoned.

[52] U.S. Cl............................ 426/41, 195/82, 426/60
[51] Int. Cl........ A23c 21/00, C12c 11/00, A23j 1/18
[58] Field of Search.......... 99/96, 57, 9, 90; 426/60, 426/41; 195/82

[56] References Cited
UNITED STATES PATENTS

| | | | |
|---|---|---|---|
| 2,809,113 | 10/1957 | Stampson et al. | 99/57 X |
| 3,466,176 | 9/1969 | Bundus et al. | 99/90 X |

OTHER PUBLICATIONS

Webb, et al., By products from Milk, the Avi Publ. Co., Inc., 1970 (pp. 25–27 & 43–56) SF239.W58.

Fish, et al., Effect of Hydrogen Peroxide on Whey Protein, Nitrogen Value of Heated Da. J. Da. Sci., Vol. 50, 1967 (pp. 1045–1048) SF221J8.

Bechtle, et al., Glucose-Residue Polymers as Protectants Against Heat Denaturation of Whey Proteins, J. Da. Sci., Vol. 54 10/1971 (pp. 1410–1416) SF221,J8.

*Primary Examiner*—David M. Naff

[57] ABSTRACT

A concentrated substrate of whey solids is inoculated with a mixed dairy starter culture capable of converting lactose to lactic acid and a mixed yeast culture capable of utilizing lactose and/or lactic acid. Before inoculation the substrate is sterilized without denaturation of the whey protein. With nutritional additives as required to optimize bacteria and yeast growth, the inoculated substrate is subjected to a protracted fermentation by the combined fermentative actions of multiple bacteria and multiple yeast organisms while aerating the substrate. The aerated fermentation is continued past an intermediate stage, as indicated by the pH minimum, where most of the lactose has been utilized and the lactic acid content of the substrate is inhibitory to the dairy starter culture bacteris, through an essential final stage where the protein and carbohydrate content of the substrate is converted substantially entirely to yeast cells, thereby producing an edible yeast cell mass product substantially free from whey protein, lactose, lactic acid, and bacteria cells.

16 Claims, No Drawings

CONVERSION OF WHEY SOLIDS TO AN EDIBLE YEAST CELL MASS

CROSS-REFERENCE

This application is a continuation-in-part of copending application Ser. No. 126,308, filed Mar. 19, 1971 and now abandoned.

BACKGROUND AND SUMMARY

Cheese whey is the largest single by-product of the dairy industry. It is probably the most controversial by-product of any agricultural industry, and has the greatest socio-economic impact of any agricultural by-product. This results from the fact that most cheese plants are in urban areas. This by-product contains about half of the nutritive value of the milk from which cheese, the desired product, was made. The problem in the handling of the by-product is one of disposal or utilization. The exact amount of whey produced in the United States, alone, is not known, but it is estimated that it is currently 650,000 to 750,000 tons of whey solids. Of this amount it is estimated that only about half is used, and the rest is wasted, creating a serious disposal problem from the standpoint of pollution.

The solids of sweet whey are much more readily utilizable as an animal or human food material than those of acid wheys. Unfortunately, acid wheys represent the major portion of the liquid wheys which are not being utilized. The magnitude of the problem will be appreciated when it is realized that acid wheys are produced in making Cottage cheese, Cream cheese, Baker's cheese, Neufchatel cheese, Ricotta cheese, and other fresh cheeses, as distinguished from aged cheeses like Cheddar cheese and Swiss cheese.

It will therefore be appreciated why there has been a long-felt need for better processes of utilization of cheese wheys, especially acid wheys. The state of the art in 1958 with respect to the disposal and utilization of whey is reviewed by Wix and Woodbine, Parts I and II, *Dairy Sci. Absts.* 18:537–548 and 621–630. The continuing efforts of the dairy industry over the last decade have failed to provide a satisfactory answer to the problem as shown by the Proceedings of the recent Whey Utilization Conference, as reported by the Agricultural Research Service, United States Dept. of Agriculature, ARS-73-69, (1970).

One of the extensively explored approaches has been the fermentative utilization of whey. Theoretically, this method should be efficient, and provide a means for increasing the nutrative value of the whey as compared with dried products obtained from a given volume of whey. Yeasts have been particularly considered as the fermentative agents. See Wasserman, *Dairy Engineering*, 77:374–379 (1960). However, there have been found to be a number of limiting factors, which oppose and interfere with a practical application of yeast conversions of whey solids. Natural wheys contain substantial protein, as lactalbumin and lactoglobulin, usually constituting about one-seventh of the total whey solids. Such whey proteins when heat denatured by high heat, fermentation medium sterilization have been shown to inhibit yeast growth. See Enebo, et al. Svensk kem Tdskr. 53:96–108 and 137–147 (1941). Such findings suggest the desirability of using deproteinized whey, but this adds to the cost of the process, and removes a potentially useful nitrogen source. The search has therefore continued for better and cheaper processes of fermentative utilization of whole whey solids.

Whey as produced usually contains only about 7 percent solids. The desirability of concentrating the whey as a preliminary to fermentative utilization has therefore been proposed. Such concentration would obviously facilitate shipment and storage of the whey prior to fermentation, and should permit the production of a product of higher solids content, which would be less expensive to dewater. However, it has been found that increasing the lactose concentration of the substrate decreases the effeciency of lactose utilization and decreases yeast production. Graham et al., *Canad. J. Tech.*, 31:85–91, 92–97, and 109–113 (1953). In fact, it has been stated that the best growth of yeast is obtained on substrates with as little as 1 to 2% carbohydrates, whereas natural wheys, even without concentration, contain about 5% lactose. See Underkofler et al., *Industrial Fermentations* Vols. I and II (1954), Chemical Publ. Co., Inc., New York.

Accumulation of metabolites in the suubstrate during the fermentation may be another limiting factor, but aeration of the substrate promotes the removal of the metabolites; and with optimal aeration, ordinary unconcentrated whey of about 7% solids can be satisfactorily yeast converted. See Cook, *The Chemistry and Biology of yeast* (1958, Academic Press, Inc.), and Wasserman et al, *J. Dairy Sci.* 44:387:392 (1961).

Prior to the present invention there has been no commercially practical method for the fermentative conversion of concentrated wheys to a yeast cell product. Where the objective is to produce a synthetic bread flavor, it has been proposed that pasteurized whey substrates of 6 to 40% solids can be fermented with a yeast, such as *Saccharomyses cerevisiae* (Baker's Yeast), and a coccus bacteria, such as an enterococcus of serological group D, to produce lactic acid in situ. This is necessary since Baker's Yeast is capable of utilizing lactic acid but not lactose. Instead of the bacteria, lactic acid can be added directly. The medium is aerated during fermentation for a growth period of up to 24 hours. A nitrogen source, such as diammonium phosphate may be added to the whey medium. (See Bundus, et al U.S. Pat. Nos. 3,466,174 and 3,466,176). In the Bundus et al process only part of the whey proteins and lactose are utilized, and the process is terminated with the substrate containing about 5% by volume of yeast together with whey protein and lactose. Preferably, as described in U.S. Pat. No. 3,466,176, the whey protein is subjected to a high heat treatment (viz, at least 180°F. for 20 to 45 minutes) before being utilized in the process, which is said to enhance the development of the desired bread flavor. Apparently this is due to partial heat denaturation of the whey protein which inhibits some of the utilization of the protein by the growing yeast.

The process of the present invention has some similarities of the Bundus et al. process, but it differs significantly therefrom with respect to the preparation of the starting material, the necessary combination of yeasts and bacteria, the process conditions, and the results obtained. All these features of the present process will be discussed below in detail.

The novel process of this invention permits the utilization of concentrated cheese wheys, including particularly concentrated acid wheys, or concentrated substrates formed from reconstituted dry whey solids. The whey solids are utilized in their natural form, that is, without deproteinization or other modification. Further, the fermentation can be carried out on an accelerated basis even though the initial substrate has a high concentration of whey solids including lactose. In treatment periods of from 10 to 50 hours, typically 36 to 48 hours, substantially all of the whey protein and lactose can be converted to a concentrated yeast cell product. The concentration of yeast cells in the substrate on the completion of the conversion, which yeast cells will contain substantially all of the protein and carbohydrate in the substrate at that time, can range from 7 to 25% by weight (dry basis), typically being about 9 to 18% by weight. Further, the yeast product is in readily recoverable form, and is suitable for use as an animal or human food or food component. The spent ferment liquor has a low B.O.D., which facilitates disposal.

DETAILED DESCRIPTION

The starting material (e.g., the initial substrate) for use in practicing the present invention can be prepared by concentration of natural wheys, including both sweet wheys and acid wheys, or by reconstitution of natural dried whey solids. Dried whey solids produced from sweet whey is a commercially available material, and can be utilized. However, the preferred whey solids are derived from acid wheys, which can be concentrated, but are not as readily produced in dry form, such as by spray drying processes. In a preferred embodiment, therefore, a natural whey, especially an acid whey, is concentrated until it contains at least 16%, and preferably 22% whey solids by weight. In the event the substrate is formed from dry whey solids, it can be reconstituted to these same concentrations.

The concentration of spray-drying procedure for the whey proteins does not require any removal of, and preferably should not involve any substantial denaturation of the whey protein. A preferred concentration process, known as reverse osmosis, is known to the art, and is used for other purposes by the dairy industry in the United States. References describing reverse osmosis concentration of cheese wheys are: *Food Processing*, 31:26–27 (January, 1970), and Agricultural Research Service, U.S.D.A. ARS-73-69, pages 36-41 (October, 1970). For preparing concentrated substrates from spray dried whey solids without denaturation of the protein, the natural liquid whey may be foamed prior to spray drying under controlled heat conditions, and this process is applicable to both sweet wheys and acid wheys. See Agricultural Research Service, U.S.D.A. ARS-73-69 (1970).

For food uses of the yeast product, or in animal or human foods or feed component, it is necessary that the substrate prior to inoculation with the fermentation microorganisms be essentially sterile. When the fermentation substrate is formed from reconstituted dry whey solids, such as spray-dried whey, the whey will usually be sufficiently free of viable microorganisms, and therefore the substrate can be prepared by mixing the dry whey solids with sterile water. If the solids have been dried at low temperatures, or have not been subjected to temperatures sufficient to kill essentially all of the microorganisms, it will usually be desirable to subject the substrate to a sterilization procedure prior to inoculation with the fermentation organisms. Moreover, in the preferred embodiment, where the natural liquid wheys are subjected to concentration by reverse osmosis, a sterilization treatment is essential where it is desired to eliminate indigenous microorganisms, which may interfere with the course of the fermentation, or which may carry over to the final product, and make it more difficult to guarantee that the product can qualify for food uses under the applicable Federal and state standards.

To protect the proteins of the whey from denaturation, it is necessary to employ a relatively cool sterilization procedure. One satisfactory procedure is hydrogen peroxide sterilization. As is well known in the sterilization art, the residual hydrogen peroxide can be destroyed with catalase, thereby assuring that there will be no carry over of hydrogen peroxide which will prevent the effective inoculation of the substrate with the fermentation organism. The general procedure for cool sterilization using hydrogen peroxide is well known. For example, it is described with reference to milk and cheese products by S. D. Roundy, *J. Dairy Sci.* 41:1460–1465 (1958). See also Swartling et al, *J. Dairy Res.* 35:423–428 (1968), and Fish et al, *J. Dairy Sci.* 50:1045–1048 (1967).

For the purposes of the present invention, a preferred sterilization procedure involves a combination of mild heat and hydrogen peroxide treatment. The conditions are selected to avoid any appreciable denaturation of the whey protein while achieving sterilization of the medium. Such sterilization can be carried out at temperatures of from 60° to 70°C. in conjunction with hydrogen peroxide treatment. Depending on the concentration of hydrogen peroxide and the temperature selected, sterilization without denaturation can be achieved in treatment times of from about 30 to 90 minutes, the time decreasing as the hydrogen peroxide concentration and temperature is increased. The concentration of hydrogen peroxide is not critical, since the excess is removed by catalase treatment. Usually, it will be desirable to employ at least a 0.5% by volume concentration of hydrogen peroxide, a particularly suitable range being from about 0.9 to 1.1% by weight hydrogen peroxide based on the concentrated whey medium. For example, a suitable treatment is 1% hydrogen peroxide concentration at 60° to 70°C. for 30 to 60 minutes. Such sterilization may be referred to as "cool" sterilization.

Where the sterilization procedure involves the use of heat, or a combination of mild heat and hydrogen peroxide treatment, it may be desirable to incorporate protective agents, such as dextrins and pectins, are described in Bechtle et al., *J. Dairy Sci.* 54, 1410–1416 (October 1971). For the purposes of the present invention, canary dextrins have been found to be particularly suitable. The canary dextrin can be added to the concentrated whey liquid at a level of 0.05 to 0.2% by weight based on the concentrated solution. Usually, a suitable level on this basis is about 0.1%.

Where the "cool" sterilization is carried out with hydrogen peroxide, as preferred, not only is further denaturation of the whey proteins prevented, but it appears that the hydrogen peroxide may function to rehydrate whey proteins damaged by previous treatment, such as may occur during cheese curd processing, which usually involves a cooking step, and/or during spray drying of the whey. Where a protein protective agent is used, such as canary dextrin, further protection is provided by the fact that non-enzymatic browning or caramelization (the Maillard reaction) of the concentrated medium is substantially avoided.

The concentrated essentially sterile solution of undenatured whey solids, which provides the starting material for the process of this invention, should contain at least 16%, and preferably at least 22% whey solids by weight. The initial lactose in the substrate will thereby be at least 10% by weight, and the initial whey proteins at least 1.5%. The starting substrate may contain at least up to 15% lactose and at least up to 3% whey proteins. Where the substrate is prepared by concentration of the initial whey, such as concentration by reverse osmosis, as is desired for preparation of natural acid wheys, a usable concentration range for the starting material is from 16–56% whey solids, composed of about 10–40% lactose and about 2–8% whey proteins. Where the concentration of lactose is greater than the solubility at the fermentation temperatures, part of the lactose may be present initially as precipitated solids. It will be understood that the lactose, proteins, and other components of the concentrated whey will usually be maintained in about the same relative proportions as in the natural whey, which typically contain total whey solids of around 7%; namely, about 5% lactose, 1% whey proteins, and 1% minerals and other minor ingredients. For concentration, shipment, and storage of concentrated liquid wheys, there can be a practical upper limit on the degree of concentration. For example, as the concentration is increased, there will be a greater tendency for some of the lactose to crystallize out of solution during shipment or storage. However, when the substrate is prepared from whey solids, and where the solid components are redissolved or maintained in solution by agitation, as will normally be provided during the fermentation, higher concentrations than 22% by weight can be used for the starting substrate. In some embodiments of the process of this invention, therefore, it can be feasible to use starting solids concentrations of 22 to 56%.

In accordance with the present invention, the whey concentrate or fermentation substrate is inoculated with a lactose-utilizing dairy starter culture containing a plurality of food-acceptable bacterial species which are capable of utilizing lactose and converting it to lactic acid. More specifically, the dairy starter culture should include two or more bacterial species selected from the genera Lactobacillus, Streptococcus, and Leuconostoc. Advantageously, at least one species is a Lactobacillus and is used in combination with a Streptococcus species or a Leuconostoc species. In a preferred embodiment, the dairy starter culture contains at least four bacterial species, including at least two different species from the genus Lactobacillus, and at least one species each from the genus Streptococcus and from the genus Leuconostoc. Advantageous species or strains within each of these genera are set out below:

| Lactobacillus | Streptococcus | Leuconostoc |
| --- | --- | --- |
| bulgaricus | lactis | dextrancium |
| casei | cremoris | citrovorum |
| delbrueckii | | |
| acidophilus | | |

All of the above species are capable of converting lactose into lactic acid, which thereby provides lactic acid for the lactic acid utilizing yeasts.

The substrate is also inoculated with a foodacceptable yeast culture. A mixed yeast culture is preferred, that is, a culture containing a plurality of yeast species. More specifically, the culture should include a plurality of yeast species selected from the genera of Candida, Saccharomyces, and Torulopsis, at least one species from each of these genera being desirable. In a preferred embodiment, the culture includes at least four different species selected from the genera Candida, Saccharomyces, and Torulopsis, and includes at least one species from each of these genera being used. Species or strains of these genera are set out below.

| Candida | Saccharomyces | Torulopsis |
| --- | --- | --- |
| psuedotropicalis | fragilis | spherica |
| utilis | lactis | cremoris |

All of the above listed species are capable of utilizing lactose and/or lactic acid, and therefor preferred for the purposes of the present invention. Since the bacterial species while growing actively in the first phase of the process convert large amounts of lactose to lactic acid, the utilization of lactic acid (or lactate) as a metabolite by the yeasts is important. For this reason, if *Saccharomyces cerevesiae* species (or other non-lactose utilizing species) is employed, it should be used in conjunction with at least one and preferably at least two lactose utilizing yeasts. Optimally, *Saccharomyces cerevesiae* is not used at all.

The best mode of practicing the invention is to inoculate the whey substrate with both the multiple dairy starter culture and the multiple yeast culture at the beginning of the fermentation. However, in an alternate embodiment, the substrate can be first inoculated with the dairy starter culture, and allowed to ferment for several hours, and while the dairy starter bacteria are continuing to grow actively, adding the yeast culture. The fermentative actions of the dairy starter culture and the yeast culture thereafter proceed concurrently. With respect to the efficiency of the process, that is, the weight of the yeast cell mass product in relation to the weight of the starting whey solids, the initial concurrent action of the two cultures is believed to be synergistic. However, in a less desirable embodiment of the invention, which nevertheless permits some of the advantages of the present invention to be realized, the action of the dairy starter culture can be permitted to proceed without addition of the yeast culture until the amount of lactic acid produced with the resulting decline in pH has reached a point where further growth of the starter culture bacteria is inhibited. At that time, the yeast culture can be added, and the fermentation permitted to proceed to conclusion. In the event the pH is too low for active growth of the yeast, an upper pH adjustment can be made. The growth of the yeast organisms will result in a continual increase in pH because of the utilization of the lactic acid by the yeast organisms, such as its conversion to cell protoplasm. Even if the alternate process is used, it is preferred to inoculate the substrate with the yeast organisms within at least 6 hours after the start of the starter culture fermentation, and before the pH of the substrate has fallen to pH 4.5.

Since the nutrients provided by the whey solids do not in themselves supply all ingredients for an optimum growth medium for the dairy starter culture bacteria or for the yeast organisms, it is desirable to incorporate nutritional additives to optimize growth of the bacteria and yeast. As is well known in the fermentation arts, the medium should contain sufficient nitrogen, phosphorous and calcium. Preferably, supplemental amounts of a nitrogen source, a calcium source, and a phosphorous source are added to the substrate. Balanced media for optimum culturing various starter mechanisms are reported in: Kosikowski, 1966, *Cheese and Fermented Milk Foods*, Edwards Bros., Inc., Ann Arbor, Mich; Cook, 1968, *Chemistry and Biology of Yeast*, Academic Press, Inc., New York; and Ingram, 1955, *An Introduction to the Biology of Yeasts*, Sir Isaac Pitman & Sons, Ltd. London. Similarly, balanced media for maximizing growth of yeast organisms are shown in: Kosikowski, 1966, *Cheese and Fermented Milk Foods*, Edwards Bros., Inc., Ann Arbor, Mich.; Cook, 1968, *Chemistry and Biology of Yeast*, Academic Press, Inc., New York; and Ingram, 1955, *An Introduction to the Biology of Yeasts*, Sir Isaac Pitman & Sons, Ltd., London.

In general, the other conditions for the fermentation, such as temperature, agitation, etc. are those which are known to be fermentation arts as favoring the growth of dairy starter organisms and of yeast organisms. For example, temperatures within the range of from 25° to 35°C. can be used, while an optimum temperature is usually about 32°C. The amounts of the cultures to be used in inoculating the substrate also correspond with quantities of various starter cultures and yeast cultures which would be conventionally used. For example, based on the substrate, from 1 to 3% by weight of the dairy starter culture, and from 1 to 3% by weight of the yeast culture should be added, and amounts up to 5% of each culture can be used.

As will be discussed below, although it is not necessary to control the pH by additions during fermentation, the pH of the medium does go through critical changes during the fermentation, which form an important part of the process. In general, the pH of the substrate at the start of the fermentation will be within the range from 4.9 to 5.9 usually above pH 5.0, and typically from about pH 5.1 to 5.5.

For achieving the results of the present invention, it has been found that aeration of the substrate within a specified range is of considerable importance. The aeration may be with ordinary atmospheric air. The air may be presterilized, if necessary, to avoid contamination of the fermentation medium with extraneous microorganisms. In general, intimately dispersed air is continuously passed through the substrate at an aeration rate within the range from 95 to 135 milliliters per minute per liter of solution per each 1% of initial lactose. For example, if the initial lactose content of the substrate is 12%, the aeration rate would range from 1020 to 1620 milliliters of air/min./l. In a preferred embodiment, the aeration rate on the same basis is from 95 to 125 milliliters of air/min./l per each 1% of initial lactose. Optimun results are believed to be achieved at about 105 to 115 ml. air/min./l/1% lactose. The technique for such aeration is known. (See, for example; Underkoffer and Hickey, 1954. Industrial Fermentation, Vol. I and II. Chemical Publ. Co., New York.) If the specified aeration rates produce undesirable foaming, this can be controlled by adding an antifoaming agent, such as a soy bean oil anti-foaming agent. It will be understood that any such antifoaming agent should be food-acceptable and non-toxic. In referring to the volume of air, it will be understood, of course, that the reference is to the air at ordinary atmospheric pressure, which will be the ambient atmospheric pressure. If the fermentation is carried out in a closed reaction tank, as preferred, the vapors coming off of the top of the tank, which will comprise mainly the aeration air after passing through the substrate, should be appropriately vented. To promote the venting and the flow of air through the solution, reduced pressure can be maintained within the vapor space above the substrate. For example, a suction fan can be used to promote the venting of the vapors. In general, a sparger or other gas-release device can be used for admitting the aeration air, the air being broken up into fine bubbles and its intimate dispersion in and mixture with the substrate being promoted by use of a stirrer or mixing device within the substrate. Preferably, the incoming air is released within the lower portion of the tank, and removed from the top portion of the tank. If the process is operated on a continuous basis, rather than on a batch basis, it is understood that the aeration procedure will be varied, as required. (See Akin et al., 1967, *Appl. Microbial*, 15:1339-1344.)

The oxygen content of the aeration air may be increased by the addition of oxygen up to a maximum of 5% nitrogen in admixture with 95% by volume of oxygen. To provide sufficient nitrogen for nitrogen fixation by the yeasts, it is preferred to utilize a mixture of oxygen and nitrogen containing at least 10% by volume nitrogen. As the oxygen content of the enriched air is increased, the volume flow rate of the aeration gas can be decreased, but at a lower rate of decrease than the corresponding increase in percent oxygen. A minimum gas flow level should be maintained to provide the gas flow or sweep required for purging the fermentation medium of undesired volatile metabolites. More specifically, with reference to the desirable flow rate set out above for atmospheric air, as enriching oxygen is added to the air, the flow rate of the enriched air may be decreased about 15% for each 20% increase in oxygen content, over that of the 20% oxygen content of atmospheric air. This differential will provide the gas flow rate needed for purging the ferment as well as for providing oxygen at an optimum level to the growing bacteria and yeast.

In the process of this invention, the fermentation involves two primary stages. In the first stage, both the plural yeast species and the plural species of lactose-utilizing bacteria are growing actively. As the bacteria convert the lactose to lactic acid, part of the lactic acid produced is immediately utilized by the yeast, and thereby converted to cell protoplasm. However, the production of lactic acid by the bacteria outruns the utilization thereof by the yeast, even where multiple species of lactose utilizing yeasts are present. Consequently, the pH of the substrate gradually drops due to the production of lactic acid as yet unutilized by the yeasts. Near the end of the first stage, the pH has fallen to a minimum level and amount of lactic acid present is such that the growth of the bacteria is substantially inhibited. This inactivation, as is known in the cheese arts, results in a drastic reduction in the population count of viable bacteria. Further, as the supply of lactose of the substrate has been depleted, the growth of the bacteria has become less active. At a time, which will vary with the concentration of the substrate, particularly the amount of initial lactose, and other process conditions, such as the particular dairy starter culture used, the fermentation passes through a minimum pH. In general, the minimum pH will be below 5.0, usually at least as low as 4.9, down to 4.4. The pH changes can be followed by periodic samplings and readings on a pH meter, or continuous pH monitoring, and specific pH adjustment by additives is not necessary. With the present process, the fermentation automatically passes through a pH minimum if sufficient fermentation time is provided. Then the pH will gradually begin to increase as the growing yeast organisms reduce the concentration of lactic acid from its maximum corresponding with the minimum pH. The final pH will be above 6.0 and usually above 6.5, such as pH 6.5–8.5.

The second stage of the fermentation can be regarded as starting with the pH reversal, that is, immediately after the substrate has passed through its minimum pH due to the build-up of unutilized lactic acid. This second stage is marked by active growth in the yeast organisms in cell numbers and cell size. As the lactic acid and other nutrients of the medium are consumed by the yeast cells, the total mass of the yeast cells progressively increases, and this process can be continued until the nutrients are virtually exhausted.

The progress of the second stage of the fermentation can also be followed by making periodic or continuous pH checks of the fermentation medium. As the lactic acid is exhausted, the pH can rise to approximate neutrality, or even a slightly alkaline pH, at the conclusion of the fermentation. During the last few hours of the fermentation, there will be relatively little increase in the total number of yeast cells, but the average size of the cells will enlarge, thereby producing a further increase in total cell mass. If desired, however, the fermentation can be terminated prior to total exhaustion of the lactic acid and other whey nutrients. During the second stage, the dead cells of the dairy starter bacteria will autolyze, and the nutrient material thereof will be utilized by the growing yeast. At the conclusion of the fermentation, not over 1%, and usually less than 0.1%, of the total cell mass will be bacterial cells. Also at the conclusion of the fermentation, less than 10% and preferably 1% of the starting whey protein will remain unutilized.

Stage one of the fermentation is completed in less than 10 hours, usually in about 3 to 8 hours, while the completion of stage two requires additional fermentation time. The overall time for the completion of the fermentation can range from 10 to 56 hours, depending upon whether the growth of the yeast cells is continued to total exhaustion of the nutrients, or terminated sooner, as may be desired to maximize the efficiency of use of the commercial production equipment.

During the first stage of the fermentation, the presence of the high concentration of lactose will tend to inhibit the growth of the yeast organisms. However, as the lactose is converted to lactic acid by the bacteria, the yeast will begin to grow more vigorously. As will be seen, therefore, although both kinds of organisms are growing actively during the first stage of the fermentation, the growth rate of the bacteria will tend to progressively decline in relation to the production of lactic acid, while the growth rate of the yeast will progressively increase in relation to the decrease in lactose concentration and the corresponding increase in lactic acid concentration.

Both of the fermentative activities will produce metabolic by-products. A substantial portion of these by-products are vaporizable, or at least susceptible to being purged from the ferment by the flow of aeration air. By continuous removal of these relatively volatile metabolites, inhibition of the growth of the organisms is minimized. On the other hand, this loss of nutrient material reduces the efficiency of the conversion of the food value of the whey solids to yeast food value. By utilizing the process conditions described above, acceptable conversion efficiencies can be obtained, at least in the range of 50–60%. It will be understood, of course, that the concentration of the yeast cell mass in the water of the substrate at the conclusion of the fermentation will vary with the starting concentration of the whey solids. Typically, the concentration of yeast cells (dry basis) in the final product may range from about 0.5 to 1.0 pounds per gallon.

The yeast cell food product can be recovered by any suitable dewatering procedure. If heat drying is employed, preferably the temperature is controlled so as not to denature the protein of the cell mass, or otherwise reduce the food value. Heat drying has the advantage of achieving a substantial final sterilization of the yeast cell product. The cell mass can also be separated from the spent ferment by standard procedures, such as filtration or centrifugation. One of the important advantages of the process is that the spent ferment will have a relatively low B.O.D. Where the fermentation is continued to substantial exhaustion of the nutrients of the ferment, it is believed that the ferment can be disposed of into natural streams or lakes without any serious pollution thereof. This invention is therefore capable of substantially solving the problem of disposing of cheese whey wastes, and is thereby particularly advantageous for treating acid wheys, which are now a serious source of pollution, when dumped into rivers or lakes without treatment.

The supernatant fluid, after yeast cell recovery contains enzymes, vitamins and minerals which may be recovered by foam spray drying. However, other methods of dewatering and concentration can be used such as reverse osmosis, as described above in connection with the concentration of whey solids.

The whey fermentation process of this invention in certain preferred embodiments is further illustrated by the following specific examples.

EXAMPLE I

To the desired quantity of concentrated acid whey, (e.g. 21–22% solids by weight; approximately 15% lactose, 3% protein) is added: 0.1% canary dextrin; 0.2% corn steep liquor; 0.3% malt extract; 0.3% yeast extract; 100 ppm of sodium sulfite; 10 ppm manganous sulfate; 10 mM/l acetate; 150 mM/l ammonium; 35 mM/l calcium; 65 mM/l chloride; 10 mM/l citrate; 60 mM/l potassium; 20 mM/l magnesium; 105 mM/l sodium; 65 mM/l phosphate; 100 mM/l sulfate and 1% hydrogen peroxide (30 stabilized solution). The medium is heated to 65°C. with gentle stirring and held at that temperature for 1 hour. The medium is cooled, and 50 Keil units/li sterile beef catalyse is added, having been diluted 1:5 with sterile distilled water, or an equivalent amount of fungal catalase may be used. A 10% sterile soybean oil antifoam agent is used to control foaming while stirring the medium. When the Roundy test for residual hydrogen peroxide (J. Dairy Sci. 41:1460– 1465, 1958) is negative, the temperative of the medium is raised to 32° C.A. 5% by volume of an actively growing mixed dairy starter bacteria and a mixed yeast culture (See Example III), preferably grown on the same medium, are added and fermentation is carried out with a high level of aeration. The pH of the ferment is periodically determined and plotted against time. The Sorensen formol titration is carried out on the ferment periodically (Hawk et al., 1954. Practical Physiological Chemistry. 13th Ed., McGraw-Hill Book Co., Inc., New York) and plotted against time on the same graph as the pH curve. Two to four hours after the ascending pH curve and the descending formol titration curve has intersected, the ferment is harvested. The yeast paste is dried by the desired method. The supernatant fluid may be concentrated by reverse osmosis, eliminating the salts, and spray dried to recover vitamin, enzyme and nucleoprotein by-products. In an average run, this produces about 90 pounds of dry yeast per 100 gal. (0.9 lb./gal.) of 22% solids whey medium in from 10 to 56 hours fermentation time. The yeast cell product was free of lactose, lactic acid, and bacteria cells.

EXAMPLE II

The whey for fermentation medium in Example I may be reconstituted sweet or acid spray dried whey powder. The whey powder is mixed with distilled water to the desired whey solids level, ranging from 16 to 56% solids by weight. The medium is prepared with the same additives and sterilized in the same manner. Fermentation is similarly carried out.

EXAMPLE III

The dairy starter cultures that have been most successfully used in this fermentation include the species: *Lactobacillus bulgaricus, casei* and *delbrueckii; Streptococcus lactis;* and *Leuconostoc citrovorum* and *dextrancium*. The yeasts that have been most successfully used in this fermentation include the species: *Candida pseudotropicalis, utilis* var. major and utilis NRRL Y-900; *Saccharomyces fragilis;* and *Torulopsis cremoris* and *spherica*. Three or more species or strains of each genera of microorganisms are advantageously used for best results. These cultures are carried on appropriate agar or broth medium in pure culture. Equal volumes of broth cultures, actively growing, are mixed to prepare the starter culture for fermentation. The starter culture is single strength acid whey medium (7% solids) incubated at 32°C. as a shake culture, or aerated at 110 ml of air per liter per minute until good active growth is reached, usually in from 16 to 18 hours. The pH value of the starter culture should not be less than 4.75. The starter inoculum volume used may range from 3 to 10% depending upon the speed of fermentation that is desired.

In Example I, the bacteria and yeasts used were:

BACTERIA

*Lactobacillus bulgaricus, casei,* and *delbrueckii.*
*Leuconostoc citrovorum,* and *dextranicum.*
*Streptococcus lactis.*

YEASTS

*Candida utilis* var. major, and Y-900
*Candida pseudotropicalis*
*Saccharomyces fragilis*
*Torulopsis cremoris,* and *spherica.*

An alternative specific mixture of yeast and bacteria is:

BACTERIA

*Lactobacillus acidophilus, bulgaricus,* and *casei*
*Streptococcus cremoris,* and *lactis.*

YEASTS

*Candida pseudotropicalis,* and *utilis.*
*Saccharomyces lactis.*
*Torulopsis cremoris,* and *spherica.*

EXAMPLE IV

In providing the added nutrients as in Example I, it was found that the following formula is satisfactory, irrespective of the concentration of acid whey used: 2% corn steep liquor (50% solids); 0.1% canary dextrin; 0.3% malt extract; 0.3% yeast extract; 0.5% calcium chloride dihydrate; 1.0% ammonium sulfate; 0.5% dipotassium phosphate; 0.5% disodium phosphate; 0.2% trisodium citrate dihydrate; 0.5% magnesium sulfate heptahydrate; 0.1% sodium acetate trihydrate; 100 ppm sodium sulfate; 3.5 ppm manganous sulfate; and 1.0% hydrogen peroxide. The medium with the added nutrients is sterilized as set out in Example I and the residual hydrogen peroxide is similarly destroyed. Fermentation also is carried out as outlined in Example I. Expected production of dry yeast will be about 90 pounds per 100 gal. of 22% solids whey medium at an aeration rate of 1,650 ml air per minute per liter of medium. The mineral components of the medium can be varied according to market price in order to minimize production costs, so long as the specified mineral concentrations are maintained as specified.

I claim:

1. A process for converting the lactose and protein in whey to edible yeast cells, comprising in combination the steps of:

a. preparing an aqueous fermentation medium containing essentially undenatured whey protein, lactose, minerals, and added nutrients to provide a balanced medium for promoting the growth of yeasts and bacteria, said medium having a solids concentration of at least 16% by weight including at least 1.5% of said undenatured whey protein and at least 10% of said lactose;

b. cool sterilizing said medium without denaturing said whey protein by treatment with hydrogen peroxide and decomposing any residual hydrogen peroxide;

c. inoculating said sterile fermentation medium with a lactose-utilizing dairy starter culture including a plurality of different bacterial species selected from the genera consisting of Lactobacillus, Streptococcus, and Leuconostoc, said dairy starter culture bacteria being capable of converting lactose to lactic acid, and also inoculating said substrate with a food-acceptable yeast culture including a plurality of different yeast species selected from the genera consisting of Candida, Saccharomyces, and Torulopsis, said yeast species being capable of utilizing both lactose and lactic acid;

d. subjecting said inoculated medium to a first stage aerated fermentation at an initial pH above 5.0 favorable to the growth of both said bacteria and yeasts, said fermentation medium decreasing in pH with the formation of lactic acid therein during said first stage wherein both said bacteria and said yeasts are growing actively until the pH of said medium drops to a pH below 5.0 inhibitory to further growth of said bacteria, thereby terminating said first stage, said lactic acid-induced inhibitory pH occurring within 10 hours from the start of said first stage fermentation; and e. thereafter subjecting said fermentation medium to a second stage aerated fermentation during which essentially only said yeasts are growing, the pH of said fermentation medium increasing during said second stage due to the utilization of said lactic acid by said yeasts, said second stage being continued until said medium is composed essentially of yeast cells at a concentration of about 7 to 25% by weight cells on a dry basis.

2. The process of claim 1 in which said initial pH in said first stage is in the range of 5.1 to 5.5, and said pH in said second stage increases to a final pH in the range of 6.5 to 8.5.

3. The process of claim 1 in which said first stage terminates in about 3 to 8 hours.

4. The process of claim 1 in which said medium on completion of said second stage contains less than 1% of the starting whey protein unincorporated in said yeast cells.

5. The process of claim 1 in which said fermentation medium at the start of said first stage fermentation contains at least about 22% solids by weight including at least about 3% of said undenatured whey protein and at least about 15% of said lactose.

6. The process of claim 1 in which said yeast species include at least one yeast species capable of utilizing both lactose and lactic acid from each of the genera Candida, Saccharomyces, and Torulopsis.

7. The process of claim 1 in which said medium is inoculated with at least four of said bacterial species, including at least two different species from the genus Lactobacillus, and at least one species each from the genus Streptococcus and, from the genus Leuconostoc.

8. The process of claim 1 in which said fermentation medium during said first stage is aerated by passing intimately dispersed air therethrough at an aeration rate ranging from about 85 to 135 milliliters of air per minute per liter of fermentation medium per each 1% of initial lactose content.

9. The process of claim 8 in which the air employed for said aeration is enriched with oxygen, and said aeration rate is decreased by 15% for each 20% increment increase in oxygen content over the 20% oxygen content of atmospheric air.

10. A process for converting the lactose and protein in whey to edible yeast cells, comprising in combination the steps of:

a. preparing an aqueous fermentation medium containing essentially undenatured whey protein, lactose, minerals, and added nutrients to provide a balanced medium for promoting the growth of yeasts and bacteria, said medium having a solids concentration of at least 16% by weight including at least 1.5% of said undenatured whey protein and at least 10% of said lactose;

b. cool sterilizing said medium without denaturing said whey protein by treatment with hydrogen peroxide and decomposing any residual hydrogen peroxide;

c. inoculating said sterile fermentation medium with a lactose-utilizing dairy starter culture including a plurality of different bacterial species capable of converting lactose to lactic acid, said bacterial species including at least one species selected from each of the genera Lactobacillus, Streptococcus, and Leuconostoc, and also inoculating said substrate with a food acceptable yeast culture including a plurality of different yeast species capable of utilizing both lactose and lactic acid, said lactose and lactic acid utilizing yeast species including at least one species selected from each of the genera Candida, Saccharomyces, and Torulopsis;

d. subjecting said inoculated medium to a first stage aerated fermentation at an initial pH of in the range of 5.1 to 5.5, said fermentation medium decreasing in pH with the build-up of lactic acid therein during said first stage wherein both said bacteria and said yeasts are growing actively until the pH of said medium has fallen to a minimum pH within the range from 4.4 to 4.9 inhibitory to the growth of said bacteria, said first stage being completed in about 3 to 8 hours; and e. thereafter subjecting said fermentation medium to a second stage aerated fermentation during which essentially only said yeasts are growing, the pH of said fermentation medium increasing during said second stage due to the utilization of said lactic acid by said yeasts until a pH above 6.0 has been reached, said second stage being continued until said medium is composed essentially of yeast cells at a concentration of about 7 to 25% by weight yeast cells on a dry basis, said yeast cells containing therein essentially all of said starting whey protein.

11. The process of claim 10 in which said fermentation medium is sterilized by treatment with said hydrogen peroxide at a temperature of 60° to 70°C. in the presence of a protein-protective agent selected from dextrins and pectins.

12. The process of claim 10 in which said fermentation medium at the start of said fermentation contains at least about 22% solids by weight including at least about 3% of said undenatured whey protein and at least about 15% of said lactose.

13. The process of claim 10 in which said fermentation medium during said first and second stages is aerated by passing intimately dispersed air therethrough at an aeration rate ranging from about 85 to 135 milliliters of air per minute per liter of fermentation medium per each 1% of initial lactose content.

14. The process of claim 13 in which the air employed for said aeration is enriched with oxygen, and said aeration rate is decreased by 15% for each 20% increment increase in oxygen content over the 20% oxygen content of atmospheric air.

15. A process for converting the lactose and protein in whey to edible yeast cells, comprising in combination the steps of:

a. preparing an aqueous fermentation medium containing essentially undenatured whey protein, lactose, minerals, and added nutrients to provide a balanced medium for promoting the growth of yeasts and bacteria, said medium having a solids concentration above 16% by weight including at least 1.5% of said undenatured whey protein and at least 10% of said lactose;

b. cool sterilizing said medium without denaturing said whey protein by treatment with hydrogen peroxide in the presence of a protein protective agent selected from dextrins and pectins and decomposing any residual hydrogen peroxide;

c. inoculating said sterile fermentation medium with a lactose-utilizing dairy starter culture including a plurality of different bacterial species selected from the genera Lactobacillus, Streptococcus, and Leuconostoc, said dairy starter culture bacteria being capable of converting lactose to lactic acid and including at least two different species from the genus Lactobacillus, and at least one species each from the genus Streptococcus and from the genus Leuconostoc, and also inoculating said substrate with a food-acceptable yeast culture including a plurality of different yeast species selected from the genera consisting of Candida, Saccharomyces, and Torulopsis, said yeast species being capable of utilizing both lactose and lactic acid and including at least one species selected from each of the genera Candida, Saccharomyces, and Torulopsis;

d. subjecting said inoculated medium to a first stage aerated fermentation at an initial pH above 5.0 favorable to the growth of both said bacteria and yeasts, said fermentation medium decreasing in pH with the formation of lactic acid therein during said first stage wherein both said bacteria and said yeasts are growing actively until the pH of said medium drops to a pH below 5.0 inhibitory to further growth of said bacteria, thereby terminating said first stage, said lactic acid-induced inhibitory pH occurring within about 3 to 8 hours from the start of said first stage fermentation; and e. thereafter subjecting said fermentation medium to a second stage aerated fermentation during which essentially only said yeasts are growing, the pH of said fermentation medium increasing during said second stage due to the utilization of said lactic acid by said yeasts until a pH of 6.5 to 8.5 has been reached, said second stage being continued until said medium is composed essentially of yeast cells at a concentration of about 7 to 25% by weight cells on a dry basis, said medium containing less than 1% of the starting whey protein unincorporated in said yeast cells.

16. The process of claim 15 in which said hydrogen peroxide treatment is carried out at a temperature of about 60° to 70°F. and during said treatment a protein-protective concentration of canary dextrin is present in said medium.

* * * * *